(12) United States Patent
Fukuoka et al.

(10) Patent No.: US 12,148,917 B2
(45) Date of Patent: Nov. 19, 2024

(54) NONAQUEOUS ELECTROLYTE SECONDARY BATTERY NEGATIVE ELECTRODE AND NONAQUEOUS ELECTROLYTE SECONDARY BATTERY

(71) Applicant: Panasonic Intellectual Property Management Co., Ltd., Osaka (JP)

(72) Inventors: Takahiro Fukuoka, Osaka (JP); Masaki Hasegawa, Osaka (JP); Masahiro Soga, Osaka (JP); Yuto Horiuchi, Osaka (JP); Takashi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 543 days.

(21) Appl. No.: 17/441,961

(22) PCT Filed: Feb. 17, 2020

(86) PCT No.: PCT/JP2020/006124
§ 371 (c)(1),
(2) Date: Sep. 22, 2021

(87) PCT Pub. No.: WO2020/195335
PCT Pub. Date: Oct. 1, 2020

(65) Prior Publication Data
US 2022/0190320 A1    Jun. 16, 2022

(30) Foreign Application Priority Data

Mar. 28, 2019  (JP) ................. 2019-063661

(51) Int. Cl.
*H01M 4/36*    (2006.01)
*H01M 4/02*    (2006.01)
(Continued)

(52) U.S. Cl.
CPC ......... *H01M 4/364* (2013.01); *H01M 4/134* (2013.01); *H01M 4/386* (2013.01);
(Continued)

(58) Field of Classification Search
None
See application file for complete search history.

(56) References Cited

U.S. PATENT DOCUMENTS

| 2008/0096110 A1* | 4/2008 | Bito ................ H01M 4/386 977/734 |
| 2008/0187838 A1* | 8/2008 | Le .................. H01M 4/134 429/231.95 |

(Continued)

FOREIGN PATENT DOCUMENTS

| CN | 103400971 A | * 11/2013 |
| CN | 104979524 A |   10/2015 |

(Continued)

OTHER PUBLICATIONS

Machine Translation of CN-103400971-A (Year: 2018).*

(Continued)

*Primary Examiner* — Gregg Cantelmo
(74) *Attorney, Agent, or Firm* — WHDA, LLP

(57) ABSTRACT

A negative electrode for a non-aqueous electrolyte secondary battery includes a negative electrode material mixture including a negative electrode active material capable of electrochemically absorbing and desorbing lithium ions, a carbon nanotube; and an acrylic resin. The negative electrode active material includes a composite material including a silicate phase, and silicon particles dispersed in the silicate phase, and the silicate phase includes at least one selected from the group consisting of alkali metal elements and Group 2 elements.

12 Claims, 2 Drawing Sheets

(51) Int. Cl.
  *H01M 4/134* (2010.01)
  *H01M 4/38* (2006.01)
  *H01M 4/58* (2010.01)
  *H01M 4/62* (2006.01)
  *H01M 10/0525* (2010.01)

(52) U.S. Cl.
  CPC ......... *H01M 4/5825* (2013.01); *H01M 4/622* (2013.01); *H01M 4/625* (2013.01); *H01M 10/0525* (2013.01); *H01M 2004/027* (2013.01)

(56) References Cited

U.S. PATENT DOCUMENTS

| | | | | |
|---|---|---|---|---|
| 2008/0318133 | A1* | 12/2008 | Matsuyama | H01M 4/66 |
| | | | | 429/300 |
| 2010/0062338 | A1* | 3/2010 | Golightly | H01M 4/621 |
| | | | | 427/122 |
| 2015/0287989 | A1 | 10/2015 | Hirose et al. | |
| 2016/0329557 | A1* | 11/2016 | Sugimori | H01M 4/483 |
| 2016/0336592 | A1 | 11/2016 | Hirose et al. | |
| 2017/0214041 | A1 | 7/2017 | Minami et al. | |
| 2019/0006656 | A1* | 1/2019 | Matsuno | H01M 10/0525 |
| 2020/0044284 | A1* | 2/2020 | Fujino | H01M 4/62 |
| 2021/0104750 | A1 | 4/2021 | Ito et al. | |

FOREIGN PATENT DOCUMENTS

| | | | | |
|---|---|---|---|---|
| JP | 2007280687 A | * | 10/2007 | |
| JP | 2015-165482 A | | 9/2015 | |
| JP | 2015-198038 A | | 11/2015 | |
| JP | 2016110876 A | * | 6/2016 | ............ A47C 9/005 |
| WO | 2016/035290 A1 | | 3/2016 | |
| WO | 2018/179817 A1 | | 10/2018 | |

OTHER PUBLICATIONS

Machin Translation of JP-2016110876-A (Year: 2016).*
Machine Translation of JP-2007280687-A (Year: 2007).*
English Translation of Chinese Search Report dated Nov. 1, 2023, issued in CN Patent Application No. 202080025167.7. (2 pages).
International Search Report dated May 19, 2020, issued in counterpart application No. PCT/JP2020/006124 (2 pages).

* cited by examiner

NONAQUEOUS ELECTROLYTE SECONDARY BATTERY NEGATIVE ELECTRODE AND NONAQUEOUS ELECTROLYTE SECONDARY BATTERY

TECHNICAL FIELD

The present invention relates to a negative electrode including a composite material in which silicon particles are dispersed in a silicate phase and/or a carbon phase, and a non-aqueous electrolyte secondary battery including the negative electrode.

BACKGROUND ART

Anon-aqueous electrolyte secondary battery typified by a lithium ion secondary battery includes a positive electrode, a negative electrode, and a non-aqueous electrolyte. The negative electrode includes a negative electrode material mixture including a negative electrode active material capable of electrochemically absorbing and desorbing lithium ions. The use of a high-capacity silicon-containing material for the negative electrode active material has been investigated.

PTL 1 proposes the use of a composite material including a lithium silicate phase represented by $Li_{2u}SiO_{2+u}$ (0<u<2), and silicon particles dispersed in the lithium silicate phase for the negative electrode active material.

CITATION LIST

Patent Literature

[PTL 1] WO 2016/035290

SUMMARY OF INVENTION

Technical Problem

Since the silicon particles of the above-described composite material are relatively large, the silicon particles may be increasingly isolated as the silicon particles expand and contract during charge and discharge, resulting in a reduction in the cycle characteristics. The isolation of the silicon particles occurs as a result of cracking of the silicon particles with expansion of the silicon particles, or gaps being formed around the silicon particles with contraction of the silicon particles.

Solution to Problem

In view of the foregoing, an aspect of the present invention relates to a negative electrode for a non-aqueous electrolyte secondary battery, including: a negative electrode material mixture including a negative electrode active material capable of electrochemically absorbing and desorbing lithium ions; a carbon nanotube; and an acrylic resin, wherein the negative electrode active material includes a composite material including a lithium ion conductive phase, and silicon particles dispersed in the lithium ion conductive phase, the lithium ion conductive phase includes a silicate phase and/or a carbon phase, and the silicate phase includes at least one selected from the group consisting of alkali metal elements and Group 2 elements.

Another aspect of the present invention relates to a non-aqueous electrolyte secondary battery including: a positive electrode; a negative electrode; and a non-aqueous electrolyte, wherein the negative electrode is the above-described negative electrode.

Advantageous Effects of Invention

According to the present invention, it is possible to improve the cycle characteristics of a non-aqueous electrolyte secondary battery including a composite material in which silicon particles are dispersed in a silicate phase and/or a carbon phase.

While the novel features of the invention are set forth in the appended claims, the invention, both as to organization and content, will be better understood and appreciated, along with other objects and features thereof, from the following detailed description taken in conjunction with the drawings.

DESCRIPTION OF EMBODIMENT

Figure 1:
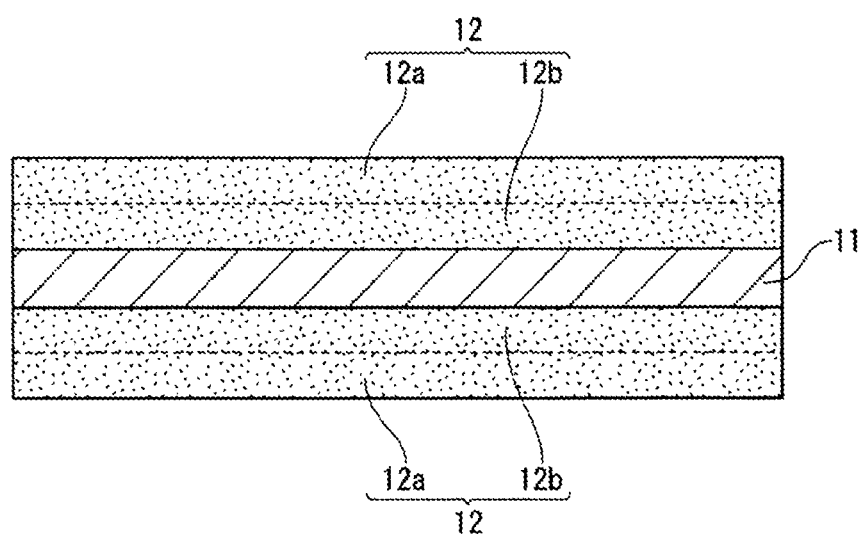
FIG. 1 is a schematic cross-sectional view of a negative electrode for a non-aqueous electrolyte secondary battery according to an embodiment of the present invention.

A negative electrode for a non-aqueous electrolyte secondary battery according to an embodiment of the present invention includes a negative electrode material mixture including a negative electrode active material capable of electrochemically absorbing and desorbing lithium ions, a carbon nanotube (hereinafter referred to as a "CNT"), and an acrylic resin. The negative electrode active material includes a composite material (hereinafter also referred to as a "first composite material") including a lithium ion conductive phase, and silicon particles dispersed in the lithium ion conductive phase. The lithium ion conductive phase includes a silicate phase and/or a carbon phase, and the silicate phase includes at least one selected from the group consisting of alkali metal elements and Group 2 elements.

The acrylic resin firmly hardens the negative electrode material mixture, thus increasing the binding strength between the particles of the negative electrode active material, and between the particles of the negative electrode active material and a negative electrode current collector. The surface of the composite particles is moderately covered with the acrylic resin. Therefore, even if the silicon particles in the composite material crack, or gaps are formed around the silicon particles during charge and discharge, the silicon particles are retained where they are, so that the isolation (exposure or detachment from the composite material) of the silicon particles is suppressed.

When the silicon particles are small as in the case of a second composite material ($SiO_x$), which will be described below, the isolation of the silicon particles is suppressed by the addition of the acrylic resin. On the other hand, when the silicon particles are large as in the case of the first composite material, the silicon particles undergo significant expansion and contraction during charge and discharge, and cracks are likely to occur also in the particles of the first composite material. Accordingly, even if the acrylic resin is added, the silicon particles may be increasingly isolated when the number of charge and discharge cycles exceeds to a certain level. The isolated silicon particles have their conductive path cut off, and cannot contribute to charge and discharge reactions. Therefore, the increased isolation of the silicon particles results in a significant reduction in the capacity.

In contrast, according to the present invention, a CNT is included together with an acrylic resin, in a negative electrode material mixture including a high-capacity first composite material. Even if the silicon particles are isolated, their conductive path is secured by the CNT, so that the silicon particles can continue to contribute to charge and discharge reactions, thus making it possible to maintain a high capacity. In the case of using a CNT for the conductive agent, a significant effect of securing the conductive path of the isolated silicon particles is achieved. Since the CNT is fibrous, contact points between the isolated silicon particles and the negative electrode active material present therearound are more easily secured than in the case of spherical conductive particles such as acetylene black. Accordingly, the conductive path is easily formed between the isolated silicon particles and the negative electrode active material present therearound.

An increased amount of the CNT may cause side reactions between the silicon particles and a non-aqueous electrolyte to proceed, resulting in deterioration of the first composite material. However, the inclusion of the acrylic resin in the negative electrode material mixture allows the first composite material (silicon particles) to be moderately covered with the acrylic resin, and also suppresses the above-described side reactions. Since the active surface of the silicon particles in the first composite particle is more likely to be exposed due to isolation, a significant effect of suppressing the above-described side reactions can be achieved with the acrylic resin. Furthermore, with a combined use of the CNT and the acrylic resin, it is also possible to suppress an increase in the contact resistance due to repeated charge and discharge between the particles of the negative electrode active material, and between the particles of the negative electrode active material and the negative electrode current collector.

Due to the foregoing, with a combination of the effects of the acrylic resin and the CNT, the cycle characteristics (capacity maintenance ratio) are significantly improved in the case of using the first composite material. Since the first composite material is used, a high initial capacity is also obtained.

(CNT)

From the viewpoint of securing the conductive path of the isolated silicon particles, the average length of the CNT is preferably 1 μm or more and 100 μm or less, and more preferably 5 μm or more and 20 μm or less. Similarly, the average diameter of the CNT is preferably 1.5 nm or more and 50 nm or less, and more preferably 1.5 nm or more and 20 nm or less.

The average length and the average diameter of the CNT are determined by image analysis using a scanning electron microscope (SEM). Specifically, the average length and the average diameter are determined by arbitrarily selecting a plurality of (e.g., about 100 to 1000) CNTs, then measuring the lengths and the diameters thereof, and averaging the measured values. Note that the length of a CNT refers to the length when the CNT is in a straight form.

In the negative electrode material mixture, a mass ratio R of the CNT to the acrylic resin is preferably ⅓ or more and 2 or less, and more preferably ½ or more and 1 or less. When the mass ratio R is in the above-described range, the effect of the addition of the acrylic resin and the effect of the addition of the CNT are achieved in a good balance. When the mass ratio R is 2 or less, side reactions between the silicon particles and the non-aqueous electrolyte are easily suppressed.

From the viewpoint of securing the conductive path of the isolated silicon particles, a content $M_C$ of the CNT in the negative electrode material mixture may be 0.1 mass % or more and 0.5 mass % or less, or may be 0.1 mass % or more and 0.4 mass % or less, relative to the whole of the negative electrode material mixture. When the content $M_C$ is 0.1 mass % or more relative to the whole of the negative electrode material mixture, the cycle characteristics are easily improved. When the content $M_C$ is 0.5 mass % or less relative to the whole of the negative electrode material mixture, side reactions between the silicon particles and the non-aqueous electrolyte are easily suppressed. Examples of the analysis method of the CNT include Raman spectrometry and thermogravimetric analysis.

(Acrylic Resin)

The acrylic resin is a polymer including at least one selected from the group consisting of a (meth)acrylic acid unit and a unit of a (meth)acrylic acid salt. The polymer may be a homopolymer or a copolymer. In the copolymer, the total of the (meth)acrylic acid unit and the unit of a (meth)acrylic acid salt is, for example, preferably 50 mol % or more, and more preferably 80 mol % or more. Note that in the present specification, "(meth)acrylic acid" refers to at least one selected from the group consisting of "acrylic acid" and "methacrylic acid".

The acrylic resin preferably includes at least a unit of a (meth)acrylic acid salt because of the ease of preparation of the negative electrode slurry and the advantage in improving the battery characteristics. In this case, examples of the (meth)acrylic acid salt include alkali metal salts such as a lithium salt and a sodium salt, and ammonium salts. Among these, from the viewpoint of reducing the internal resistance, a lithium salt of (meth)acrylic acid is preferable, and a lithium salt of acrylic acid is more preferable.

Of the carboxyl groups included in the acrylic resin, the ratio (substitution rate) of carboxyl groups whose hydrogen atom is substituted with alkali metal atom or the like is preferably 50% or more because of the ease of preparation of the negative electrode slurry and the advantage in improving the battery characteristics (cycle characteristics, etc.).

Specific examples of the acrylic resin include polyacrylic acid, polymethacrylic acid, copolymers (an acrylic acid-methacrylic acid copolymer, an ethylene-acrylic acid copolymer, etc.) including repeating units of acrylic acid and/or methacrylic acid, and salts thereof. The acrylic resins may be used alone or in a combination of two or more.

The weight-average molecular weight of the acrylic resin is preferably 3,000 or more and 10,000,000 or less. When the weight-average molecular weight of the acrylic resin is in the above-described range, the effect of the acrylic resin in improving the cycle characteristics and reducing the internal resistance are sufficiently achieved, and the gelation (viscosity increase) of the negative electrode slurry is suppressed, so that the negative electrode is easily fabricated.

The content $M_A$ of the acrylic resin in the negative electrode material mixture may be 0.2 mass % or more and 1.5 mass % or less, relative to the whole of the negative electrode material mixture. When the content $M_A$ is 0.2 mass % or more relative to the whole of the negative electrode material mixture, the effects of the acrylic resin in suppressing the isolation of the silicon particles and suppressing side reactions between the composite material and the non-aqueous electrolyte are easily achieved. When the content $M_A$ is 1.5 mass % or less relative to the whole of the negative electrode material mixture, the particles of the negative electrode active material are easily moderately covered with the acrylic resin, so that the internal resistance can be kept sufficiently small. In addition, the negative electrode slurry can have a reduced viscosity, and thus is easily prepared. A sufficient amount of the negative electrode active material is secured, making it possible to easily increase the capacity.

The negative electrode may include a negative electrode current collector, and a negative electrode material mixture layer supported on a surface of the negative electrode current collector. In this case, it is preferable that the presence proportion of the CNT (CNT amount) and/or the mass ratio of the CNT to the acrylic resin (hereinafter referred to as a "CNT amount or the like") is smaller on the surface side of the negative electrode material mixture layer than on the negative electrode current collector side of the negative electrode material mixture layer. By reducing the CNT amount or the like on the surface side of the negative electrode material mixture layer, side reactions between the silicon particles and the non-aqueous electrolyte are easily suppressed. The first composite material and the non-aqueous electrolyte are likely to come into contact with each other on the surface side of the negative electrode material mixture layer. Accordingly, when the CNT amount or the like is large, side reactions between the silicon particles and the non-aqueous electrolyte may proceed on the surface side of the negative electrode material mixture layer.

A negative electrode material mixture layer having a smaller CNT amount or the like on the surface side than on the negative electrode current collector side can be formed, for example, in the following manner.

A plurality of negative electrode slurries each including a composite material, a CNT, an acrylic resin, and a dispersing medium, and having CNT amounts or the like different from one another are prepared. The negative electrode slurries are applied to the negative electrode current collector in the descending order of CNT amounts or the like, and are dried. A negative electrode slurry having a larger CNT amount or the like may be used to form a second region, which will be described below, and a negative electrode slurry having a smaller CNT amount or the like may be used to form a first region, which will be described below.

For example, when the negative electrode material mixture layer is divided into a first region on the surface side and a second region other than the first region (the negative electrode current collector side), the first region and the second region each having a thickness one-half the thickness of the negative electrode material mixture layer, it is preferable that at least one of the condition A and the condition B is satisfied.

Condition A: a CNT content $M_{C1}$ in the first region is smaller than a CNT content $M_{C2}$ in the second region.

Condition B: a mass ratio $R_1$ of the CNT to the acrylic resin in the first region is smaller than a mass ratio $R_2$ of the CNT to the acrylic resin in the second region.

Note that the condition A includes a case where the CNT content $M_{C1}$ is 0 mass %, and the condition B includes a case where the mass ratio $R_1$ of the CNT is 0. Under the condition A, the ratio: $M_{C1}/M_{C2}$ of $M_{C1}$ to $M_{C2}$ satisfies 0 or more and less than 1, and may be 0 or more and 0.6 or less, or 0 or more and 0.3 or less. Under the condition B, the ratio: $R_1/R_2$ of $R_1$ to $R_2$ satisfies 0 or more and less than 1, and may be 0 or more and 0.75 or less, or 0 or more and 0.5 or less. From the viewpoint of suppressing side reactions between the silicon particles and the non-aqueous electrolyte, it is preferable that the first region does not include any CNT. That is, the content $M_{C1}$ is preferably 0 mass %, and the mass ratio $R_1$ is preferably 0. It is preferable that both the first region and the second region include an acrylic resin. For sampling of the first region and the second region when analyzing the first region and the second region, a diagonal cutting device (device name: SAICAS manufactured by DAIPLA WINTES CO., LTD.) or the like is used, for example.

Here, FIG. 1 is a schematic cross-sectional view of a negative electrode for a non-aqueous electrolyte secondary battery according to an embodiment of the present invention.

The negative electrode includes a negative electrode current collector 11, and negative electrode material mixture layers 12 formed on both surfaces of the negative electrode current collector 11. The negative electrode material mixture layer 12 includes a first region 12a on the surface side of the negative electrode, and a second region 12b on the negative electrode current collector 11 side thereof, the first and second regions 12a and 12b each having a thickness one-half the thickness of the negative electrode material mixture layer 12. The negative electrode material mixture layer 12 includes a composite material, a CNT, and an acrylic resin. The content $M_{C1}$ of the CNT in the first region 12a and the content $M_{C2}$ of the CNT in the second region 12b may satisfy a relationship of $0 \leq M_{C1}/M_{C2} < 1$. The mass ratio $R_1$ of the CNT to the acrylic resin in the first region 12a and the mass ratio $R_2$ of the CNT to the acrylic resin in the second region 12b may satisfy a relationship of $0 \leq R_1/R_2 < 1$.

(Negative Electrode Active Material)

The negative electrode active material includes a silicon-containing material capable of electrochemically absorbing and desorbing lithium ions. The silicon-containing material is advantageous in increasing the capacity of a battery. The silicon-containing material includes at least a first composite material.

(First Composite Material)

The first composite material includes a lithium ion conductive phase, and silicon particles dispersed in the lithium ion conductive phase, wherein the lithium ion conductive phase includes a silicate phase and/or a carbon phase, and the silicate phase includes at least one selected from the group consisting of alkali metal elements and Group 2 elements. That is, the first composite material includes at least one of a composite material (hereinafter also referred to as an "LSX material") including a silicate phase and silicon particles dispersed in the silicate phase, and a composite material (hereinafter also referred to as a "Si—C material") including a carbon phase and silicon particles dispersed in the carbon phase. By controlling the amount of the silicon particles dispersed in the lithium ion conductive phase, it is possible to increase the capacity. The stress generated with expansion and contraction of the silicon particles during charge and discharge is relaxed by the lithium conductive phase. Therefore, the first composite material is advantageous in achieving an increased capacity and improved cycle characteristics of a battery.

From the viewpoint of increasing the capacity, the average particle size of the silicon particles before the initial charge is usually 50 nm or more, and preferably 100 nm or more. The LSX material can be produced, for example, by grinding a mixture of silicate and a silicon raw material into fine particles, using a grinding apparatus such as a ball mill, followed by heat-treating the fine particles in an inert atmosphere. The LSX material may also be produced by synthesizing fine particles of silicate and fine particles of the silicon raw material without using a grinding apparatus, and heat-treating a mixture thereof in an inert atmosphere. By adjusting the blending ratio between the silicate and the silicon raw material, and the particle size of the silicon raw material in the above-described process, it is possible to control the amount and the size of the silicon particles to be dispersed in the silicate phase, thus easily increasing the capacity.

From the viewpoint of suppressing cracking of the silicon particles, the average particle size of the silicon particles before the initial charge is preferably 500 nm or less, and more preferably 200 nm or less. After the initial charge, the average particle size of the silicon particles is preferably 400 nm or less. By micronizing the silicon particles, the volume change during charge and discharge is reduced, and the structural stability of the first composite material is further improved.

The average particle size of the silicon particles is measured using a cross-sectional image of the first composite material, obtained using a scanning electron microscope (SEM). Specifically, the average particle size of the silicon particles is determined by averaging the maximum diameters of arbitrarily selected 100 silicon particles.

Each of the silicon particles dispersed in the lithium ion conductive phase has a particulate phase of a simple substance of silicon (Si), and is usually composed of a plurality of crystallites. The crystallite size of the silicon particles is preferably 30 nm or less. When the crystallite size of the silicon particles is 30 nm or less, it is possible to reduce the amount of volume change caused by expansion and contraction of the silicon particles during charge and discharge, thus further improving the cycle characteristics. For example, the isolation of silicon particles due to a reduction of contact points between the silicon particles and the surroundings as a result of formation of voids in the surroundings of the silicon particles during contraction of the particles is suppressed, so that a reduction in charge and discharge efficiency due to the isolation of the particles is suppressed. The lower limit value of the crystallite size of the silicon particles is not particularly limited, but is, for example, 1 nm or more.

The crystallite size of the silicon particles is more preferably 10 nm or more and 30 nm or less, and even more preferably 15 nm or more and 25 nm or less. When the crystallite size of the silicon particles is 10 nm or more, the surface area of the silicon particles can be kept small, and therefore the silicon particles are less likely to undergo degradation accompanied by generation of an irreversible capacity.

The crystallite size of the silicon particles is calculated from the half-width of a diffraction peak attributed to the Si (111) plane in an X-ray diffraction (XRD) pattern of the silicon particles, using the Scherrer equation.

From the viewpoint of increasing the capacity, the content of the silicon particles in the first composite material is preferably 30 mass % or more, more preferably 35 mass % or more, and even more preferably 55 mass % or more. This results in good lithium ion diffusivity, making it possible to easily achieve excellent load characteristics. On the other hand, from the viewpoint of improving the cycle characteristics, the content of the silicon particles in the first composite material is preferably 95 mass % or less, more preferably 75 mass % or less, and even more preferably 70 mass % or less. This results in a reduction in the area of the surface of the silicon particles that is exposed without being covered with the lithium ion conductive phase, so that reactions between the electrolytic solution and the silicon particles are easily suppressed.

The content of the silicon particles can be measured by Si-NMR In the following, desirable measurement conditions for Si-NMR will be described.

Measurement apparatus: a solid-state nuclear magnetic resonance spectrometer (INOVA-400), manufactured by Varian Inc.
Probe: Varian 7 mm CPMAS-2
MAS: 4.2 kHz
MAS rate: 4 kHz
Pulse: DD (45° pulse+signal acquisition time 1H decoupling)
Repetition time: 1200 sec
Observation width: 100 kHz
Center of observation: approximately −100 ppm
Signal acquisition time: 0.05 sec
Number of times of integrations: 560
Sample amount: 207.6 mg The silicate phase includes at least one of an alkali metal element (a Group 1 element other than hydrogen in the long-form periodic table) and a Group 2 element in the long-form periodic table. The alkali metal element includes lithium (Li), potassium (K), sodium (Na), and the like. The Group 2 element includes magnesium (Mg), calcium (Ca), barium (Ba), and the like. Among these, a silicate phase including lithium (hereinafter also referred to as a "lithium silicate phase") is preferable because of the small irreversible capacity and the high initial charge and discharge efficiency. That is, the LSX material is preferably a composite material including a lithium silicate phase, and silicon particles dispersed in the lithium silicate phase.

The silicate phase is, for example, a lithium silicate phase (oxide phase) including lithium (Li), silicon (Si), and oxygen (O). The atomic ratio: O/Si of O to Si in the lithium silicate phase is, for example, greater than 2 and less than 4. A ratio of O/Si of greater than 2 and less than 4 (z in the formula below satisfies $0<z<2$) is advantageous in stability and lithium ion conductivity. Preferably, O/Si is greater than 2 and less than 3 (z in the formula below satisfies $0<z<1$). The atomic ratio: Li/Si of Li to Si in the lithium silicate phase is, for example, greater than 0 and less than 4. The lithium silicate phase may include, in addition to Li, Si, and O, a trace amount of other elements such as iron (Fe), chromium (Cr), nickel (Ni), manganese (Mn), copper (Cu), molybdenum (Mo), zinc (Zn), and aluminum (Al).

The lithium silicate phase may have a composition represented by the formula: $Li_{2z}SiO_{2+z}$ ($0<z<2$). From the viewpoint of the stability, the ease of fabrication, the lithium ion conductivity, and the like, z preferably satisfies a relationship of $0<z<1$, and more preferably satisfies $z=\frac{1}{2}$.

The lithium silicate phase has a smaller number of sites that can react with lithium, as compared with the $SiO_2$ phase of $SiO_x$. Therefore, LSX is less likely to produce an irreversible capacity due to charge and discharge, as compared with $SiO_x$. In the case of dispersing silicon particles in the lithium silicate phase, excellent charge and discharge efficiency is achieved in the initial stage of charge and discharge. In addition, the content of the silicon particles can be freely changed, and it is thus possible to design a negative electrode having a high capacity.

The composition of the silicate phase of the first composite material can be analyzed, for example, by the following method.

The battery is disassembled, and the negative electrode is taken out and washed with a non-aqueous solvent such as ethylene carbonate. After drying, a cross section of the negative electrode material mixture layer is processed using a cross section polisher (CP), to obtain a sample. A backscattered electron image of the cross section of the sample was obtained using a field emission scanning electron microscope (FE-SEM), and the cross-section of the first composite material is observed. For the silicate phase of the observed first composite material, qualitative and quantitative analysis of the elements is performed using an Auger electron spectroscopy (AES) analyzer (acceleration voltage: 10 kV, beam current: 10 nA). For example, the composition of the lithium silicate phase is determined based on the obtained contents of lithium (Li), silicon (Si), oxygen (O), and other elements.

Note that the first composite material and the second composite material can be differentiated from each other on the cross section of the sample. Usually, the average particle size of the silicon particles in the first composite material is larger than the average particle size of the silicon particles in the second composite material, and the two composite materials can be easily differentiated from each other through observation of the particle diameters.

For the cross-section observation and analysis of the sample described above, a carbon sample stage may be used for fixing the sample in order to prevent the diffusion of Li. In order to prevent degeneration of the cross section of the sample, a transfer vessel that holds and transports the sample without exposing the sample to the atmosphere may be used.

The carbon phase may be composed of, for example, amorphous carbon having low crystallinity. The amorphous carbon may be, for example, hard carbon, soft carbon, or amorphous carbon other than these. The amorphous carbon can be obtained, for example, by sintering a carbon source under an inert atmosphere, and grinding the resulting sintered body. A Si—C material can be obtained, for example, by mixing a carbon source and a silicon raw material, stirring the mixture while crushing, using a stirrer such as a ball mill, followed by firing the mixture in an inert atmosphere. As the carbon source, it is possible to use, for example, saccharides and a water-soluble resin and the like, such as carboxymethyl cellulose (CMC), polyvinyl pyrrolidone, cellulose, and sucrose. When mixing the carbon source and the silicon raw material, the carbon source and the silicon raw material may be dispersed in a dispersing medium such as alcohol, for example. By adjusting the blending ratio between the carbon source and the silicon raw material, and the particle size of the silicon raw material in the above-described process, it is possible to control the amount and the size of the silicon particles to be dispersed in the carbon phase, thus easily increasing the capacity.

It is preferable that the first composite material forms a particulate material (hereinafter also referred to as "first particles") having an average particle size of 1 to 25 μm, and more preferably 4 to 15 μm. Within the above-described particle size range, the stress generated due to volume change of the first composite material during charge and discharge is easily reduced, so that favorable cycle characteristics are easily achieved. The first particles also have an appropriate surface area, so that a decrease in the capacity caused by side reactions with the electrolytic solution is also suppressed.

The average particle size of the first particles means a particle size (volume average particle size) with which an accumulated volume value is 50% in a particle size distribution measured by laser diffraction/scattering. As the measurement apparatus, it is possible to use, for example, an "LA-750" manufactured by HORIBA, Ltd. (HORIBA).

The first particles may include a conductive material that coats at least a portion of the surface thereof. The conductivity can be dramatically increased by coating the surface of the first particles with the conductive material. Preferably, the conductive layer has a thickness small enough not to substantially affect the average particle size of the first particles.

(Second Composite Material)

The silicon-containing material may further include a second composite material including a $SiO_2$ phase, and silicon particles dispersed in the $SiO_2$ phase. The second composite material is represented by $SiO_x$, where x is, for example, about 0.5 or more and about 1.5 or less. The second composite material is obtained by heat-treating silicon monoxide, and separating the silicon monoxide into a $SiO_2$ phase and a fine Si phase (silicon particles) dispersed in the $SiO_2$ phase through disproportionation. In the case of the second composite material, the silicon particles are smaller than those in the case of the first composite material, and the average particle size of the silicon particles in the second composite material is, for example, about 5 nm. The second composite material has a smaller capacity than the first composite material, but is advantageous in that it undergoes less expansion during charge. In the case of the second composite material, the silicon particles are smaller, and therefore the extent of improvement in the cycle characteristics achieved by the combined use of the CNT and the acrylic resin is smaller than in the case of the first composite material. In the negative electrode material mixture, the mass ratio of the second composite material to the first composite material is, for example, 1 or less.

(Carbon Material)

The negative electrode active material may further include a carbon material that electrochemically absorbs and desorbs lithium ions. The carbon material has a smaller degree of expansion and contraction during charge and discharge than the silicon-containing material. By using the silicon-containing material and the carbon material in combination, the state of contact between the negative electrode active material particles and between the negative electrode material mixture layer and the negative electrode current collector can be more favorably maintained during repeated charge and discharge. That is, it is possible to improve the cycle characteristics while providing the high capacity of the silicon-containing material to the negative electrode. From the viewpoint of increasing the capacity and improving the cycle characteristics, the ratio of the carbon material to the total of the silicon-containing material and the carbon material is preferably 98 mass % or less, more preferably 70 mass % or more and 98 mass % or less, and even more preferably 75 mass % or more and 95 mass % or less.

Examples of the carbon material used for the negative electrode active material include graphite, graphitizable carbon (soft carbon), and hardly graphitizable carbon (hard carbon). Among these, graphite, which is excellent in charge and discharge stability and has a small irreversible capacity, is preferable. Graphite means a material having a graphite crystal structure, and includes, for example, natural graphite, artificial graphite, and graphitized mesophase carbon particles. The carbon materials may be used alone or in a combination of two or more.

(Non-Aqueous Electrolyte Secondary Battery)

A non-aqueous electrolyte secondary battery according to an embodiment of the present invention includes a positive electrode, a negative electrode, and a non-aqueous electrolyte, and a negative electrode including the above-described negative electrode material mixture is used as the negative electrode.

In the following, the non-aqueous electrolyte secondary battery will be described in detail.

[Negative Electrode]

The negative electrode may include a negative electrode current collector, and a negative electrode material mixture layer supported on a surface of the negative electrode current collector. The negative electrode material mixture layer can be formed by applying, to the surface of the negative electrode current collector, a negative electrode slurry in which the negative electrode material mixture is dispersed in a dispersing medium, and drying the slurry. The resulting dried coating film may be rolled as needed. The negative electrode material mixture layer may be formed on one surface of the negative electrode current collector, or may be formed on both surfaces thereof.

The negative electrode material mixture includes a negative electrode active material, a CNT, and an acrylic resin, as essential components. The negative electrode material mixture can include a binder other than the acrylic resin, a conductive agent other than the CNT, a thickener, and the like as optional components.

Anon-porous conductive substrate (a metal foil, etc.), or a porous conductive substrate (a mesh structure, a net structure, a punched sheet, etc.) is used as the negative electrode current collector. Examples of the material of the negative electrode current collector include stainless steel, nickel, a nickel alloy, copper, and a copper alloy. The thickness of the negative electrode current collector is not particularly limited, but is preferably 1 to 50 μm, and more desirably 5 to 20 μm, from the viewpoint of the balance between the strength and the weight reduction of the negative electrode.

Examples of the binder other than the acrylic resin include fluorocarbon resins such as polytetrafluoroethylene and polyvinylidene fluoride (PVDF); polyolefin resins such as polyethylene and polypropylene; polyamide resins such as aramid resin; polyimide resins such as polyimide and polyamide imide; vinyl resins such as polyacrylonitrile and polyvinyl acetate; polyvinyl pyrrolidone; polyethersulfone; and rubber-like materials such as a styrene-butadiene copolymer rubber (SBR). The binders other than the acrylic resin may be used alone or in a combination of two or more.

Examples of the conductive agent other than the CNT include carbons such as acetylene black; conductive fibers such as carbon fibers and metal fibers; carbon fluoride; metal powders such as aluminum; conductive whiskers such as zinc oxide and potassium titanate; conductive metal oxides such as titanium oxide; and organic conductive materials such as phenylene derivatives. The conductive agents may be used alone or in a combination of two or more.

Examples of the thickener include cellulose derivatives (cellulose ether, etc.) such as carboxymethyl cellulose (CMC) and modified products thereof (also including salts such as a Na salt), and methylcellulose; a saponified product of a polymer having a vinyl acetate unit such as polyvinyl alcohol; and polyether (polyalkylene oxide such as polyethylene oxide). The thickeners may be used alone or in a combination of two or more.

Examples of the dispersing medium include, but are not limited to, water, alcohol such as ethanol, ether such as tetrahydrofuran, amide such as dimethylformamide, N-methyl-2-pyrrolidone (NMP), and solvent mixtures thereof.

[Positive Electrode]

The positive electrode may include a positive electrode current collector, and a positive electrode material mixture layer supported on a surface of the positive electrode current collector. The positive electrode material mixture layer can be formed by applying, to the surface of the positive electrode current collector, a positive electrode slurry in which the positive electrode material mixture is dispersed in a dispersing medium such as NMP, and drying the slurry. The resulting dried coating film may be rolled as needed. The positive electrode material mixture layer may be formed on one surface of the positive electrode current collector, or may be formed on both surfaces thereof. The positive electrode material mixture can include the positive electrode active material as an essential component, and include a binder, a conductive agent, and the like as optional components.

A lithium-containing composite oxide can be used as the positive electrode active material, for example. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, and $Li_2MPO_4F$ (M is at least one selected from the group consisting of Na, Mg, Sc, Y, Mn, Fe, Co, Ni, Cu, Zn, Al, Cr, Pb, Sb, and B). Here, a=0 to 1.2, b=0 to 0.9, and c=2.0 to 2.3. Note that the value of a, which represents the molar ratio of lithium, increases or decreases due to charge and discharge.

Among these, it is preferable to use a lithium nickel composite oxide represented by $Li_aNi_bM_{1-b}O_2$ (M is at least one selected from the group consisting of Mn, Co, and Al, $0<a\le1.2$, and $0.3\le b\le1$). From the viewpoint of increasing the capacity, it is more preferable that $0.85\le b\le1$ is satisfied. From the viewpoint of the stability of the crystal structure, $Li_aNi_bCo_cAl_dO_2$ ($0<a\le1.2$, $0.85\le b<1$, $0<c<0.15$, $0<d\le0.1$, b+c+d=1) including Co and Al as M is even more preferable.

As the binder and the conductive agent, those shown as the examples for the negative electrode can be used. As the binder, an acrylic resin may be used. As the conductive agent, graphite such as natural graphite and artificial graphite may be used.

The shape and the thickness of the positive electrode current collector can be respectively selected from the shape and the range conforming to the negative electrode current collector. Examples of the material of the positive electrode current collector include stainless steel, aluminum, an aluminum alloy, and titanium.

[Non-Aqueous Electrolyte]

The non-aqueous electrolyte includes a non-aqueous solvent, and a lithium salt dissolved in the non-aqueous solvent. The concentration of the lithium salt in the non-aqueous electrolyte is, for example, preferably 0.5 mol/L or more and 2 mol/L or less. By setting the lithium salt concentration within the above-described range, it is possible to obtain a non-aqueous electrolyte having excellent ion conductivity and moderate viscosity. However, the lithium salt concentration is not limited to the above examples.

Examples of the lithium salt include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylate, LiCl, LiBr, LiI, borate salts, and imide salts. Examples of the borate salts include lithium bis(1,2-benzenediolate(2-)—O,O') borate, lithium bis(2,3-naphthalenediolate(2-)—O,O') borate, lithium bis(2,2'-biphenyldiolate(2-)—O,O') borate, and lithium bis(5-fluoro-2-olate-1-benzenesulfonate-O,O') borate. Examples of the imide salts include lithium bisfluorosulfonylimide ($LiN(FSO_2)_2$), lithium bistrifluoromethanesulfonyl imide ($LiN(CF_3SO_2)_2$), lithium trifluoromethanesulfonyl nonafluorobutanesulfonyl imide ($LiN(CF_3SO_2)(C_4F_9SO_2)$), and lithium bispentafluoroethanesulfonyl imide ($LiN(C_2F_5SO_2)_2$). Among these, $LiPF_6$ is preferable. $LiPF_6$ is likely to form a passive film on the surface of constituent members of a battery, such as a positive electrode current collector and an outer can. The aforementioned members are protected with the passive film. The lithium salts may be used alone or in a combination of two or more.

As the non-aqueous solvent, it is possible to use, for example, a cyclic carbonic acid ester, a chain carbonic acid ester, a cyclic carboxylic acid ester, a chain carboxylic acid ester, and the like. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). Examples of the chain carboxylic acid ester include methyl formate, ethyl formate, propyl formate, methyl acetate, ethyl acetate, propyl acetate, methyl propionate, ethyl propionate, and propyl propionate. The non-aqueous solvents may be used alone or in a combination of two or more.

[Separator]

Usually, it is desirable that a separator is interposed between the positive electrode and the negative electrode. The separator has a high ion permeability, as well as suitable mechanical strength and insulating properties. As the separator, it is possible to use a microporous thin film, a woven fabric, a non-woven fabric, and the like. Polyolefins such as polypropylene and polyethylene are preferable as the material of the separator.

Examples of the structure of the non-aqueous electrolyte secondary battery include a structure in which an electrode group formed by winding a positive electrode and a negative electrode with a separator interposed therebetween, and a non-aqueous electrolyte are housed in an outer package. Alternatively, an electrode group having another configuration, such as a stacked electrode group formed by stacking a positive electrode and a negative electrode with a separator interposed therebetween, may be used in place of the wound electrode group. For example, the non-aqueous electrolyte secondary battery may have any configuration such as a cylindrical configuration, a prismatic configuration, a coin configuration, a button configuration, and a laminated configuration.

Figure 2:
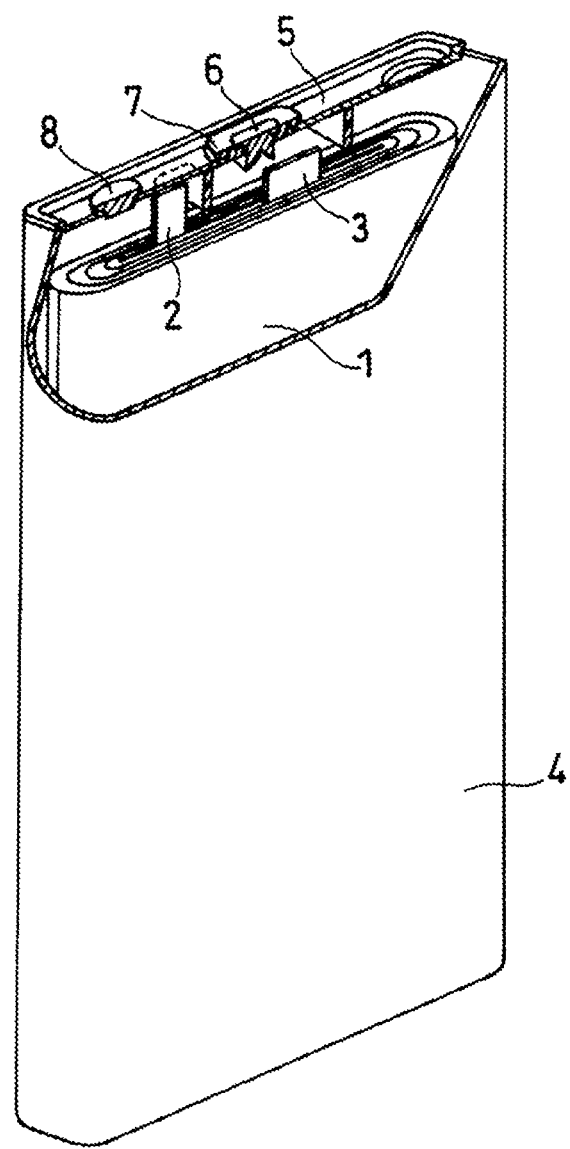
FIG. 2 is a partially cut-away, schematic oblique view of a non-aqueous electrolyte secondary battery according to an embodiment of the present invention.

In the following, the structure of a prismatic non-aqueous electrolyte secondary battery as an example of the non-aqueous electrolyte secondary battery according to the present invention will be described with reference to FIG. 2. FIG. 2 is a partially cut-away, schematic oblique view of a non-aqueous electrolyte secondary battery according to an embodiment of the present invention.

The battery includes a bottomed prismatic battery case 4, and an electrode group 1 and a non-aqueous electrolyte (not shown) that are housed in the battery case 4. The electrode group 1 includes a long band-shaped negative electrode, a long band-shaped positive electrode, and a separator that is interposed therebetween and prevents a direct contact therebetween. The electrode group 1 is formed by winding the negative electrode, the positive electrode, and the separator around a flat plate-shaped winding core, and pulling out the winding core.

An end of a negative electrode lead 3 is attached to a negative electrode current collector of the negative electrode through welding or the like. The other end of the negative electrode lead 3 is electrically connected to a negative electrode terminal 6 provided on a sealing plate 5 via an resin insulating plate (not shown). The negative electrode terminal 6 is insulated from the sealing plate 5 by a resin gasket 7. An end of a positive electrode lead 2 is attached to a positive electrode current collector of the positive electrode through welding or the like. The other end of the positive electrode lead 2 is connected to a back surface of the sealing plate 5 via an insulating plate. That is, the positive electrode lead 2 is electrically connected to the battery case 4 also serving as a positive electrode terminal. The insulating plate isolates the electrode group 1 and the sealing plate 5 from each other and also isolates the negative electrode lead 3 and the battery case 4 from each other. A peripheral edge of the sealing plate 5 is fitted to an opening end portion of the battery case 4, and the fitted portion is laser welded. In this manner, an opening of the battery case 4 is sealed by the sealing plate 5. An electrolytic solution injection hole formed in the sealing plate 5 is closed by a sealing plug 8.

EXAMPLES

Hereinafter, the present invention will be specifically described by way of examples. However, the present invention is not limited to the following examples.

Example 1

[Preparation of First Composite Material (LSX Material)]

Silicon dioxide and lithium carbonate were mixed such that the atomic ratio: Si/Li was 1.05, and the mixture was fired at 950° C. in the air for 10 hours, to obtain lithium silicate represented by $Li_2Si_2O_5$ ($z=\frac{1}{2}$). The obtained lithium silicate was ground so as to have an average particle size of 10 μm.

The lithium silicate ($Li_2Si_2O_5$) having an average particle size of 10 μm and a silicon raw material (3N, average particle size: 10 μm) were mixed at a mass ratio of 45:55. The mixture was filled into a pot (made of SUS, volume: 500 mL) of a planetary ball mill (P-5, manufactured by Fritsch Co., Ltd.), then 24 SUS balls (diameter: 20 mm) were placed in the pot, and the cover was closed. Then, the mixture was ground at 200 rpm for 50 hours in an inert atmosphere.

Next, the mixture in the form of powder was taken out in the inert atmosphere, and was fired at 800° C. for 4 hours, with a pressure was applied thereto using a hot pressing machine in the inert atmosphere, thus obtaining a sintered body (LSX material) of the mixture.

Thereafter, the LSX material was ground, then passed through a 40 μm mesh, and thereafter the resulting LSX particles were mixed with coal pitch (MCP 250, manufactured by JFE Chemical Corporation). Then, the mixture was fired at 800° C. in an inert atmosphere, thus forming, on the surface of the LSX particles, a conductive layer including a conductive carbon. The coating amount of the conductive layer was 5 mass % to the total mass of the LSX particles and the conductive layer. Thereafter, using a sieve, LSX particles each including a conductive layer and having an average particle size of 5 were obtained.

The average particle size of the silicon particles as determined by the method described previously was 100 nm. An XRD analysis of the LSX particles indicated that the crystallite size of the silicon particles calculated from the diffraction peak attributed to the Si (111) plane using the Scherrer equation was 15 nm.

As a result of conducting an AES analysis for the lithium silicate phase, the composition of the lithium silicate phase was $Li_2Si_2O_5$. The content of the silicon particles in the LSX particles as measured by Si-NMR was 55 mass % (the content of $Li_2Si_2O_5$ was 45 mass %).

[Fabrication of Negative Electrode]

Water was added to the negative electrode material mixture, and thereafter the whole was stirred using a mixer (T.K.HIVIS MIX manufactured by PRIMIX Corporation), to prepare a negative electrode slurry. As the negative electrode material mixture, a mixture of a negative electrode active material, a conductive agent, a lithium salt of polyacrylic acid (PAA-Li), carboxymethyl cellulose sodium (CMC-Na), and a styrene-butadiene rubber (SBR) was used. In the negative electrode material mixture, the mass ratio of the negative electrode active material, the CMC-Na and the SBR was 100:0.9:1.

As the negative electrode active material, a mixture of a silicon-containing material and graphite was used. As the silicon-containing material, the LSX (first composite material) obtained as above was used. In the negative electrode material mixture, the mass ratio of the LSX and the graphite was 9:91.

As the conductive agent, a CNT (average diameter: 9 nm, average length: 12 μm) was used. As the PAA-Li, a PAA-Li having a substitution rate of 85% to 90% and a weight molecular weight of 500,000 to 5,000,000 was used. The content $M_C$ of the CNT in the negative electrode material mixture was 0.3 mass %. The content $M_A$ of the PAA-Li in the negative electrode material mixture was 0.6 mass %. Note that each of the content $M_C$ of the CNT and the content $M_A$ of the PAA-Li in the negative electrode material mixture was the mass ratio relative to the whole of the negative electrode material mixture.

Next, the negative electrode slurry was applied to a surface of a copper foil such that the mass per m$^2$ of the negative electrode material mixture was 140 g, and the resulting coating film was dried, and thereafter rolled, to form a negative electrode material mixture layer having a density 1.6 g/cm$^3$. The negative electrode material mixture layer was formed on both surfaces of the copper foil, to obtain a negative electrode.

[Fabrication of Positive Electrode]

A lithium nickel composite oxide (LiNi$_{0.8}$Co$_{0.18}$Al$_{0.02}$O$_2$), acetylene black, and polyvinylidene fluoride were mixed at a mass ratio of 95:2.5:2.5, and N-methyl-2-pyrrolidone (NMP) was added thereto. Thereafter, the mixture was stirred using a mixer (T.K.HI-VIS MIX manufactured by PRIMIX Corporation), to prepare a positive electrode slurry. Next, the positive electrode slurry was applied to a surface of an aluminum foil, and the resulting coating film was dried, and thereafter rolled, to form a positive electrode material mixture layer having a density of 3.6 g/cm$^3$. The positive electrode material mixture layer was formed on both surfaces of the aluminum foil, to obtain a positive electrode.

[Preparation of Non-Aqueous Electrolyte]

Anon-aqueous electrolyte was prepared by dissolving a lithium salt in a non-aqueous solvent. As the non-aqueous solvent, a solvent in which ethylene carbonate (EC) and dimethyl carbonate (DMC) were mixed at a volume ratio of 3:7 was used. As the lithium salt, LiPF$_6$ was used. The concentration of the LiPF$_6$ in the non-aqueous electrolyte was 1.0 mol/L.

[Fabrication of Non-Aqueous Electrolyte Secondary Battery]

A tab was attached to each of the electrodes, and the positive electrode and the negative electrode were spirally wound with a separator interposed therebetween such that the tabs were located at the outermost peripheral portion, to fabricate an electrode group. The electrode group was inserted into an outer package made of an aluminum laminate film, and the whole was vacuum dried at 105° C. for 2 hours. Thereafter, the non-aqueous electrolyte was injected into the outer package, and the opening of the outer package was sealed, to fabricate a battery A1.

Comparative Example 1

SiO was used in place of the LSX as the silicon-containing material. Note that SiO is a second composite material (average particle size of the silicon particles: 5 nm) represented by SiO$_x$ and satisfying x=1. No CNT was included in the negative electrode material mixture. The content $M_A$ of the PAA-Li in the negative electrode material mixture was 0.3 mass %. Except for the above, a battery B1 was fabricated in the same manner as in Example 1.

Comparative Example 2

SiO was used in place of the LSX as the silicon-containing material. Note that SiO is a second composite material (average particle size of the silicon particles: 5 nm) represented by SiO$_x$ and satisfying x=1. Except for the above, a battery B2 was fabricated in the same manner as in Example 1.

Comparative Example 3

No CNT was included in the negative electrode material mixture. The content $M_A$ of the PAA-Li in the negative electrode material mixture was 0.3 mass %. Except for the above, a battery B3 was fabricated in the same manner as in Example 1.

Comparative Example 4

A battery B4 was fabricated in the same manner as in Example 1 except for using acetylene black (AB) power (average particle size: 0.1 μm) in placed of the CNT as the conductive agent.

The following evaluation was performed for the batteries A1 and B1 to B4.

[Evaluation 1: Charge and Discharge Cycle Test]

Each of the batteries was subjected to constant current charge at a current of 0.3 It until a voltage of 4.2 V was reached, and thereafter subjected to constant voltage charge at a voltage of 4.2 V until a current of 0.02 It was reached. Thereafter, the battery was subjected to constant current discharge at a current of 0.5 It until a voltage of 2.5 V was reached. The rest period between charge and discharge was 10 minutes. Charge and discharge were performed under a 25° C. environment.

Note that (1/X) It represents a current, (1/X) It (A) is a rated capacity (Ah)/X(h), and X represents the time required to charge or discharge the amount of electricity corresponding to the rated capacity. For example, 0.5 It means that X=2, and the current value is equal to a rated capacity (Ah)/2(h).

Charge and discharge were repeated under the above-described conditions. The proportion (percentage) of the discharge capacity at the 50th cycle to the discharge capacity at the 1st cycle was determined as the capacity maintenance ratio. The evaluation results are shown in Table 1. Note that the initial capacity in Table 1 is the discharge capacity at the 1st cycle.

TABLE 1

| Battery No. | Silicon-containing material | | Conductive agent content $M_c$ (mass %) | | PAA-Li content $M_A$ (mass %) | Initial capacity (mAh) | 50th cycle capacity maintenance ratio (%) |
|---|---|---|---|---|---|---|---|
| | Type | Average particle size of Si particles (nm) | CNT | AB | | | |
| B1 | SiO | 5 | 0 | 0 | 0.3 | 5000 | 93.7 |
| B2 | SiO | 5 | 0.3 | 0 | 0.6 | 5000 | 94.3 |
| B3 | LSX | 100 | 0 | 0 | 0.3 | 5200 | 88.8 |
| B4 | LSX | 100 | 0 | 0.3 | 0.6 | 5200 | 90.0 |
| A1 | LSX | 100 | 0.3 | 0 | 0.6 | 5200 | 93.1 |

The battery A1 obtained a high initial capacity and a high capacity maintenance ratio. Although the increase in the capacity maintenance ratio of the battery B2 relative to the battery B1 was as small as 0.6%, the increase in the capacity maintenance ratio of the battery A1 relative to the battery B3 was increased to 4.3%.

The batteries B1 and B2, in each of which SiO was used as the silicon-containing material, obtained a low initial capacity. The battery B3, in which no CNT was included in the negative electrode material mixture, obtained a low capacity maintenance ratio. The battery B4, in which AB was used as the conductive agent, obtained a low capacity maintenance ratio.

Examples 2 to 5, Comparative Example 5

In the negative electrode material mixture, the mass ratio of the LSX and the graphite was 6:94. Each of the values of the CNT content $M_C$ and the PAA-Li content $M_A$ in the negative electrode material mixture was as shown in Table 2. Note that each of the values shown in Table 2 is a mass ratio relative to the whole amount of the negative electrode material mixture. Except for the above, batteries C1 to C4 of Examples 2 to 5, and a battery D1 of Comparative Example 5 were fabricated in the same manner as in Example 1. The following evaluation was performed for the batteries C1 to C4 and D1.

[Evaluation 2: Charge and Discharge Cycle Test]

Charge and discharge was repeated under the same conditions as those in Evaluation 1. The proportion (percentage) of the discharge capacity at the 200th cycle to the discharge capacity at the 1st cycle was determined as the capacity maintenance ratio. The evaluation results are shown in Table 2.

TABLE 2

| Battery No. | Negative electrode material mixture | | | 200th cycle capacity maintenance ratio (%) |
|---|---|---|---|---|
| | CNT content $M_c$ (mass %) | PAA-Li content $M_A$ (mass %) | Mass ratio R CNT/PAA-Li | |
| D1 | 0 | 0.3 | 0 | 78.4 |
| C1 | 0.3 | 0.9 | 1/3 | 80.2 |
| C2 | 0.3 | 0.6 | 1/2 | 81.1 |
| C3 | 0.3 | 0.3 | 1 | 81.3 |
| C4 | 0.6 | 0.3 | 2 | 79.7 |

Each of the batteries C1 to C4, in which the mass ratio R of the CNT to the PAA-Li was 1/3 or more and 2 or less, obtained a higher capacity maintenance ratio, than the battery D1, in which the mass ratio R was 0.

In particular, the batteries C2 to C3, in which the mass ratio R was 1/2 or more and 1 or less, obtained an even higher capacity maintenance ratio.

Examples 6 to 10, Comparative Example 6

In the negative electrode material mixture, the mass ratio of the LSX and the graphite was 6:94. Each of the values of the CNT content $M_C$ and the PAA-Li content $M_A$ in the negative electrode material mixture was as shown in Table 3. Note that the each of the values shown in Table 3 is the mass ratio relative of the whole amount of the negative electrode material mixture. Except for the above, batteries E1 to E5 of Examples 6 to 10 and a battery F1 of Comparative Example 6 were fabricated in the same manner as in Example 1. The following evaluation was performed for the batteries E1 to E5 and F1.

[Evaluation 3: Charge and Discharge Cycle Test]

Charge and discharge were repeated under the same conditions as those in Evaluation 1. The proportion (percentage) of the discharge capacity at the 350th cycle to the discharge capacity at the 1st cycle was determined as the capacity maintenance ratio. The evaluation results are shown in Table 3.

TABLE 3

| Battery No. | Negative electrode material mixture | | 350th cycle capacity maintenance ratio (%) |
|---|---|---|---|
| | CNT content $M_c$ (mass %) | PAA-Li content $M_A$ (mass %) | |
| F1 | 0 | 0.5 | 73.4 |
| E1 | 0.1 | 0.5 | 74.2 |
| E2 | 0.2 | 0.5 | 74.3 |
| E3 | 0.3 | 0.5 | 74.4 |
| E4 | 0.4 | 0.5 | 74.2 |
| E5 | 0.5 | 0.5 | 73.9 |

The batteries E1 to E5, in which the negative electrode material mixture including the CNT and the PAA-Li used, and the CNT content $M_C$ in the negative electrode material mixture was 0.1 mass % or less and 0.5 mass % or less, obtained a higher capacity maintenance ratio than the battery F1, which included the PAA-Li and not included the CNT.

Examples 11 to 13

[Preparation of First Negative Electrode Slurry]

In a first negative electrode material mixture, the mass ratio of the LSX and the graphite was 6:94. Each of the values of the CNT content $M_{C2}$ and the PAA-Li content $M_{A1}$ in the first negative electrode material mixture was shown in Table 4. Except for the above, a first negative electrode slurry was prepared in the same manner as in Example 1. Note that each of the values shown in Table 4 is the mass ratio relative to the whole amount of the first negative electrode material mixture.

[Preparation of Second Negative Electrode Slurry]

In a second negative electrode material mixture, the mass ratio of the LSX and the graphite was 6:94. Each of the values of the CNT content $M_{C2}$ of and the PAA-Li content $M_{A2}$ in the second negative electrode material mixture was as shown in Table 4. Except for the above, a second negative electrode slurry was prepared in the same manner as in Example 1. Note that each of the values shown in Table 4 is the mass ratio relative to the whole amount of the second negative electrode material mixture.

[Formation of First Negative Electrode Material Mixture Layer (First Region) and Second Negative Electrode Material Mixture Layer (Second Region)]

The second negative electrode slurry and the first negative electrode slurry were applied in this order to a surface of a copper foil serving as a negative electrode current collector. The amounts of the first negative electrode slurry and the second negative electrode slurry applied were adjusted such that each of the masses of the first negative electrode material mixture and the second negative electrode material mixture was 70 g per m² of the surface of the copper foil. The resulting coating film of the first negative electrode slurry and the second negative electrode slurry was dried, and thereafter rolled, to form a negative electrode material mixture layer having a density of 1.6 g/cm³. The negative electrode material mixture layer was formed on both surfaces of the copper foil, to obtain a negative electrode. Each of the negative electrode material mixture layers included a first negative electrode material mixture layer and a second negative electrode material mixture layer, in this order from the surface side thereof, the first and second negative electrode material mixture layers having the same thickness. That is, the first region is constituted by the first negative electrode material mixture layer, and the second region was constituted by the second negative electrode material mixture layer.

Batteries G1 to G3 of Examples 11 to 13 were fabricated in the same manner as in Example 1 except for using the negative electrode fabricated as above. The following evaluation was performed for the batteries G1 to G3.

[Evaluation 4: Charge and Discharge Cycle Test]

Charge and discharge were repeated under the same conditions as those in Evaluation 1. The proportion (percentage) of the discharge capacity at the 200th cycle to the discharge capacity at the 1st cycle was determined as the capacity maintenance ratio. The evaluation results are shown in Table 4.

content $M_{C1}$ was 0 mass %, the CNT content $M_{C2}$ was 0.5 mass %, the mass ratio $R_1$ was 0, and the mass ratio $R_2$ was 1, obtained an even higher capacity maintenance ratio.

INDUSTRIAL APPLICABILITY

The non-aqueous electrolyte secondary battery according to the present invention is useful as a main power source for mobile communication devices, mobile electronic devices, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1 . . . . Electrode group
2 . . . . Positive electrode lead
3 . . . . Negative electrode lead
4 . . . Battery case
5 . . . . Sealing plate
6 . . . . Negative electrode terminal
7 . . . . Gasket
8 . . . . Sealing plug
11 . . . . Negative electrode current collector
12 . . . . Negative electrode material mixture layer
12a . . . . First region
12b . . . . Second region

The invention claimed is:

1. A negative electrode for a non-aqueous electrolyte secondary battery, comprising:
a negative electrode material mixture including a negative electrode active material capable of electrochemically absorbing and desorbing lithium ions; a carbon nanotube; and an acrylic resin,
wherein the negative electrode active material includes a composite material including a lithium ion conductive phase, and silicon particles dispersed in the lithium ion conductive phase,
the lithium ion conductive phase includes a silicate phase and/or a carbon phase, and
the silicate phase includes at least one selected from the group consisting of alkali metal elements and Group 2 elements,

TABLE 4

| | First region (surface side) | | | Second region (negative electrode current collector side) | | | | | 200th cycle |
|---|---|---|---|---|---|---|---|---|---|
| Battery No. | CNT content $M_{c1}$ (mass %) | PAA-Li content $M_{A1}$ (mass %) | Mass ratio $R_1$ ($M_{c1}/M_{A1}$) | CNT content $M_{c2}$ (mass %) | PAA-Li content $M_{A2}$ (mass %) | Mass ratio $R_2$ ($M_{c2}/M_{A2}$) | $M_{c1}/M_{c2}$ | $R_1/R_2$ | capacity maintenance ratio (%) |
| G1 | 0 | 0 | — | 0.5 | 1.0 | 0.5/1.0 | 0 | — | 85.1 |
| G2 | 0.5 | 1.0 | 0.5/1.0 | 0 | 0 | — | — | — | 83.9 |
| G3 | 0 | 0.5 | 0/0.5 | 0.5 | 0.5 | 0.5/0.5 | 0 | 0 | 85.6 |

Each of the batteries G1 to G3 exhibited a high capacity maintenance ratio. The battery G3, in which the CNT wherein the carbon nanotube is disposed outside the composite material, and wherein a content Mc of the carbon nanotube in the negative electrode material mixture is 0.1 mass % or more and 0.5 mass % or less, relative to a whole of the negative electrode material mixture.

2. The negative electrode for a non-aqueous electrolyte secondary battery according to claim 1,
wherein the acrylic resin includes at least a unit of a (meth)acrylic acid salt.

3. The negative electrode for a non-aqueous electrolyte secondary battery according to claim 1,
wherein the (meth)acrylic acid salt is a lithium salt of (meth)acrylic acid.

4. The negative electrode for a non-aqueous electrolyte secondary battery according to claim 1,
wherein, in the negative electrode material mixture, a mass ratio R of the carbon nanotube to the acrylic resin is ⅓ or more and 2 or less.

5. The negative electrode for a non-aqueous electrolyte secondary battery according to claim 1,
wherein, in the negative electrode material mixture, a mass ratio R of the carbon nanotube to the acrylic resin is ½ or more and 1 or less.

6. The negative electrode for a non-aqueous electrolyte secondary battery according to claim 1,
wherein a content $M_A$ of the acrylic resin in the negative electrode material mixture is 0.2 mass % or more and 1.5 mass % or less, relative to the whole of the negative electrode material mixture.

7. The negative electrode for a non-aqueous electrolyte secondary battery according to claim 1, further comprising:
a negative electrode current collector; and a layer of the negative electrode material mixture supported on a surface of the negative electrode current collector.

8. The negative electrode for a non-aqueous electrolyte secondary battery according to claim 7,
wherein the carbon nanotube is present in a smaller proportion on a surface side of the layer than on a negative electrode current collector side of the layer.

9. The negative electrode for a non-aqueous electrolyte secondary battery according to claim 8,
wherein the layer includes a first region on the surface side of the layer, and a second region other than the first region,
each of the first region and the second region has a thickness one-half a thickness of the layer, and
a ratio: $M_{C1}/M_{C2}$ of a content $M_{C1}$ of the carbon nanotube in the first region to a content $M_{C2}$ of the carbon nanotube in the second region is 0 or more and less than 1.

10. The negative electrode for a non-aqueous electrolyte secondary battery according to claim 7,
wherein a mass ratio R of the carbon nanotube to the acrylic resin is smaller on a surface side of the layer than on the negative electrode current collector side of the layer.

11. The negative electrode for a non-aqueous electrolyte secondary battery according to claim 10,
wherein the layer includes a first region on the surface side of the layer, and a second region other than the first region,
each of the first region and the second region has a thickness one-half a thickness of the layer, and
a ratio: $R_1/R_2$ of a mass ratio $R_1$ of the carbon nanotube to the acrylic resin in the first region to a mass ratio $R_2$ of the carbon nanotube to the acrylic resin in the second region is 0 or more and less than 1.

12. A non-aqueous electrolyte secondary battery comprising:
a positive electrode; a negative electrode; and a non-aqueous electrolyte,
wherein the negative electrode is the negative electrode according to claim 1.

* * * * *